(12) United States Patent
Meroux et al.

(10) Patent No.: US 10,844,820 B2
(45) Date of Patent: Nov. 24, 2020

(54) SYSTEM AND METHOD FOR AUTOMATED VEHICLE PERFORMANCE ANALYTICS

(71) Applicant: FORD GLOBAL TECHNOLOGIES, LLC, Dearborn, MI (US)

(72) Inventors: Dominique Meroux, Fair Oaks, CA (US); Zhen Jiang, Mountain View, CA (US); Chen Zhang, South Lyon, MI (US); Rebecca Kreucher, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/204,344

(22) Filed: Nov. 29, 2018

(65) Prior Publication Data
US 2020/0173412 A1 Jun. 4, 2020

(51) Int. Cl.
*F02N 11/08* (2006.01)
*G06Q 30/02* (2012.01)
*G06Q 50/06* (2012.01)
*F02D 41/04* (2006.01)
*G07C 5/00* (2006.01)
*F02D 41/06* (2006.01)
*G07C 5/02* (2006.01)

(52) U.S. Cl.
CPC ........ *F02N 11/0818* (2013.01); *F02D 41/042* (2013.01); *F02D 41/065* (2013.01); *G06Q 30/0283* (2013.01); *G06Q 50/06* (2013.01); *G07C 5/008* (2013.01); *G07C 5/02* (2013.01); *B60K 2370/174* (2019.05); *F02N 11/084* (2013.01); *F02N 11/0822* (2013.01); *F02N 11/0825* (2013.01); *F02N 11/0829* (2013.01); *F02N 11/0837* (2013.01); *F02N 11/0844* (2013.01); *F02N 2300/20* (2013.01); *F02N 2300/304* (2013.01)

(58) Field of Classification Search
CPC ............... F02D 41/042; F02N 11/0818; F02N 11/0822; F02N 11/0825; F02N 11/0829; F02N 11/0837; F02N 11/084; F02N 11/0844; F02N 2300/20; F02N 2300/304; B60K 2370/174; G07C 5/02; G06Q 30/0283
See application file for complete search history.

(56) References Cited

U.S. PATENT DOCUMENTS 7,657,438 B2 * 2/2010 Obayashi .............. B60W 10/26
705/1.1
8,095,291 B2 1/2012 Christen et al.
8,784,266 B2 7/2014 Christen et al.
(Continued)

FOREIGN PATENT DOCUMENTS

WO WO-2017044088 A1 * 3/2017 .......... F02N 11/0818

*Primary Examiner* — Mahmoud Gimie
*Assistant Examiner* — Joshua Campbell
(74) *Attorney, Agent, or Firm* — Michael Spenner; Brooks Kushman PC

(57) ABSTRACT

A vehicle includes a controller programmed to activate a fuel savings feature upon satisfaction of transition conditions and inhibit the transition according to satisfaction of inhibit conditions. The controller is further programmed to accumulate data indicative of the inhibit conditions and a time associated with the conditions being satisfied over a drive cycle.

11 Claims, 4 Drawing Sheets

(56) References Cited

U.S. PATENT DOCUMENTS

| | | | | |
|---|---|---|---|---|
| 8,793,060 | B2* | 7/2014 | Takeuchi | F02N 11/0814 701/112 |
| 2004/0162792 | A1* | 8/2004 | Satou | G06Q 10/04 705/400 |
| 2009/0326790 | A1* | 12/2009 | Christen | F02N 11/0822 701/112 |
| 2013/0245925 | A1* | 9/2013 | Malone | F02N 11/0818 701/113 |
| 2014/0046578 | A1* | 2/2014 | Balzer | F02D 28/00 701/112 |
| 2014/0249959 | A1* | 9/2014 | Ishida | G06Q 30/0623 705/26.61 |
| 2015/0134226 | A1* | 5/2015 | Palmer | B60W 40/10 701/101 |
| 2015/0154872 | A1* | 6/2015 | Schafer | G07C 5/008 701/1 |
| 2017/0067433 | A1* | 3/2017 | Ahn | F02N 11/0818 |
| 2018/0204252 | A1* | 7/2018 | Boulard | G06Q 30/0206 |
| 2018/0351980 | A1* | 12/2018 | Galula | H04L 63/1425 |

\* cited by examiner

SYSTEM AND METHOD FOR AUTOMATED VEHICLE PERFORMANCE ANALYTICS

TECHNICAL FIELD

This application generally relates to a system for automated collection and analysis of information related to fuel-saving features in a vehicle.

BACKGROUND

The United States Environmental Protection Agency (EPA) tests vehicles using test driving cycles to assess city and highway fuel economy. The test driving cycles are standard speed profiles that operate the vehicle powertrain in a variety of typical driving patterns. However, the test driving cycles do not always engage all fuel-saving features that are implemented in vehicles. Vehicles may include features that improve fuel economy but are not necessarily exercised during the test driving cycles. A manufacturer may earn off-cycle credits for achieving fuel-economy benefits that are not measured by the test driving cycles. The off-cycle credits may be used to satisfy overall fuel economy and emissions for the product mix produced by the manufacturer.

The EPA provides several ways to claim off-cycle credits. Off-cycle credits may be claimed based on a list or menu of credit values for certain technologies. A manufacturer may claim a predetermined credit value by deploying the corresponding technology. The manufacturer may also demonstrate the benefits of the technology by additional testing. A manufacturer may demonstrate additional $CO_2$ reductions based on an alternative methodology that includes additional testing that sufficiently demonstrates the benefits.

SUMMARY

A vehicle includes an engine and a controller programmed to cause the engine to transition to an autostop state upon satisfaction of transition conditions and inhibit the transition according to satisfaction of inhibit conditions, and, responsive to the transition conditions being satisfied and the autostop being inhibited, accumulate data indicative of the inhibit conditions and a time associated with the inhibit conditions being satisfied.

The controller may be further programmed to, responsive to a request to transfer data, transfer the data and the time to a server. The controller may be further programmed to estimate a value indicative of an impact on fuel economy associated with the data and the time. The controller may be further programmed to estimate a fuel cost associated with the data and the time. The controller may be further programmed to accumulate the data and the time over an ignition cycle. The controller may be further programmed to accumulate the data and the time over a lifetime of the vehicle. The controller may be further programmed to estimate an amount of $CO_2$ associated with the data and time.

A vehicle includes a controller programmed to activate a fuel savings feature upon satisfaction of transition conditions and inhibit the transition according to satisfaction of inhibit conditions, and, responsive to the transition conditions being satisfied and the fuel savings feature not being activated, accumulate data indicative of the inhibit conditions and a time associated with the inhibit conditions being satisfied and output for display an estimated fuel economy impact caused by the inhibit conditions.

The fuel savings feature may be an engine start/stop feature. The controller may be further programmed to, responsive to a request to transfer data, transfer the data and the time to a server. The controller may be further programmed to estimate a value indicative of an impact on fuel economy associated with the data and the time. The controller may be further programmed to estimate a fuel cost associated with the data and the time. The controller may be further programmed to accumulate the data and time over an ignition cycle. The controller may be further programmed to accumulate the data and the time over a lifetime of the vehicle. The controller may be further programmed to estimate an amount of $CO_2$ associated with the data and time.

A method includes inhibiting, by a controller, a fuel savings feature for a vehicle responsive to satisfaction of inhibit conditions in a presence of activation conditions for the fuel savings feature being satisfied. The method further includes accumulating, by the controller, data indicative of the inhibit conditions and a time associated with the inhibit conditions being satisfied. The method further includes transferring, by the controller, the data and time to a server.

The method may further include aggregating, by the server, data from vehicles having a same nameplate and model year. The method may further include estimating, by the controller, at least one of a fuel cost, a fuel economy value, and an amount of $CO_2$ associated with the data and time. The method may further include requesting, by a server, transfer of the data and time at periodic intervals from the controller. The method may further include accumulating the data and time over an ignition cycle and a vehicle lifetime.

DETAILED DESCRIPTION

To claim off-cycle credits, the vehicle manufacturer may need to demonstrate that the on-road benefits of a feature or technology exceeds the menu credit. Demonstrating the on-road benefits may allow the feature/technology to be categorized as an alternative demonstration credit instead of a menu credit. This can free up cap space in the menu credit category. The menu credit is presently capped at 10 gram/mile. By freeing up cap space in the menu credit category, the manufacturer may deploy additional advanced $CO_2$ reducing technologies. In order to claim the off-cycle credits, the manufacturer must demonstrate the benefits of the technology. The system and methods described herein provide a system and methods to aid in demonstrating and evaluating fuel economy effects of advanced technologies for which off-cycle credits may be claimed.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

One feature that may not be sufficiently evaluated during the EPA test driving cycles is engine start/stop. A micro-hybrid vehicle may automatically stop its internal combustion engine for a period of time when particular conditions are satisfied. Automatic engine stops may improve fuel economy by reducing the amount of time the engine is idling while the vehicle is at standstill or coasting to a stop. The micro-hybrid vehicle may automatically restart the engine when certain conditions are satisfied.

Figure 1:
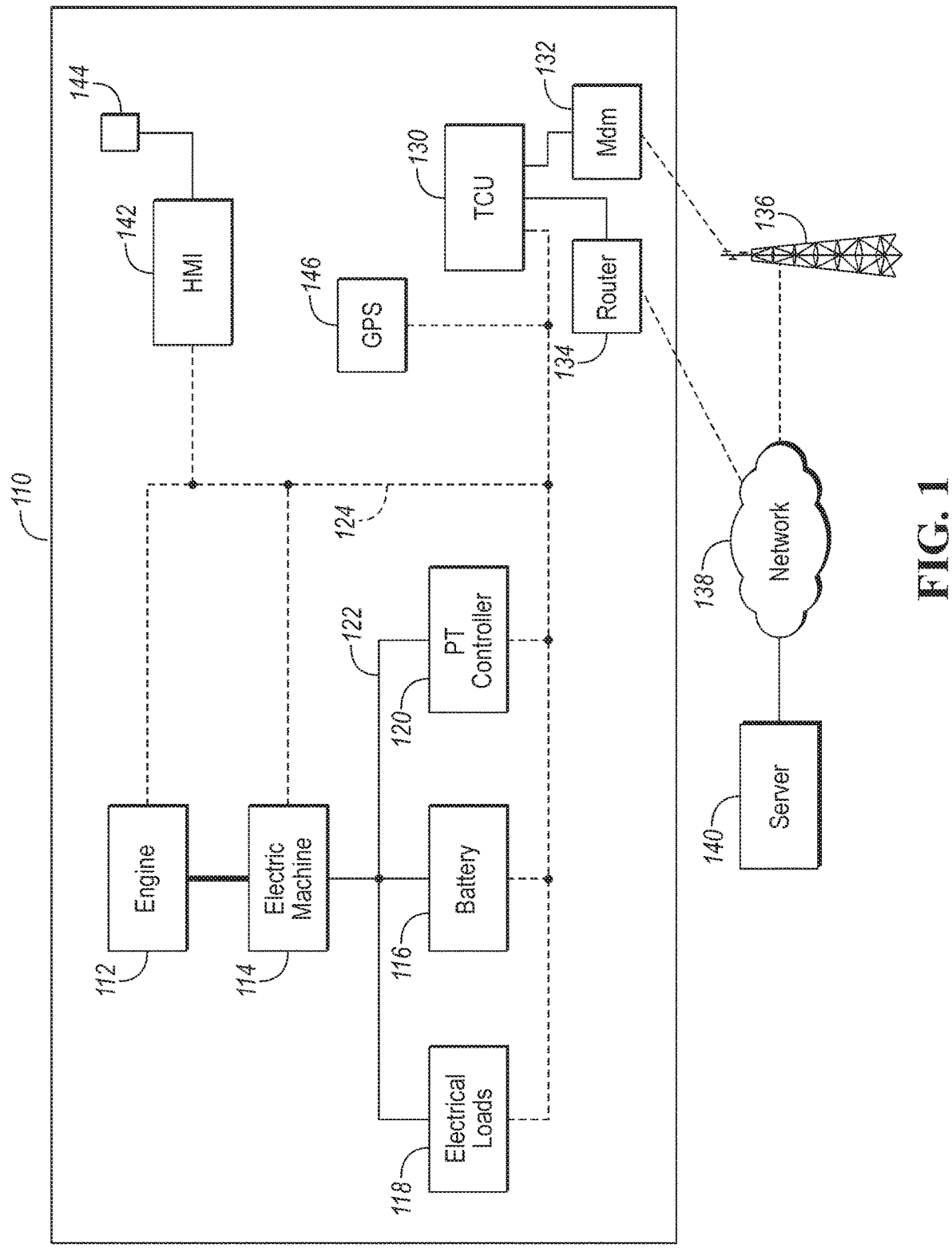
FIG. 1 is a block diagram for a micro-hybrid vehicle.

Referring to FIG. 1, a micro-hybrid vehicle 110 may include an engine 112, an electric machine 114 that may be referred to as an alternator or integrated starter generator, a battery 116 (e.g., a 12 V battery), electrical loads 118 (e.g., pumps of a climate control system, a power steering assist system, etc.) in communication with/under the control of one or more powertrain controllers 120 (as indicated by dashed line). The engine 112 is mechanically connected with the electric machine 114 (as indicated by heavy line) such that the engine 112 may drive the electric machine 114 to generate electric current. The electric machine 114 and battery 116 are electrically connected with each other and the electrical loads 118 (as indicated by thin line) via a power network 122. The power network 122 may be a series of conductors electrically interconnecting the components. The power network 122 may include power and ground signals. Hence, the electric machine 114 may charge the battery 116; the electrical loads 118 may consume electric current provided by the electric machine 114 and/or battery 116.

A powertrain controller 120 may initiate an engine autostop/autostart of the engine 112. A complete engine autostop/autostart cycle may include a period in which the engine is stopped and a period in which the engine is restarted. As the vehicle 110 comes to a stop, for example, the powertrain controller 120 may issue a command to begin the process to stop the engine 112, thus preventing the electric machine 114 from providing electric current to the electrical loads 118. The battery 116 may provide electric current to the electrical loads 118 while the engine 112 is stopped. As a brake pedal (not shown) is disengaged (and/or an accelerator pedal (not shown) is engaged) after an engine autostop, the powertrain controller 120 may issue a command to begin the process to start the engine 112, thus enabling the electric machine 114 to provide electric current to the electrical loads 118.

The powertrain controller 120 may monitor conditions for autostarting and autostopping of the engine 112 during an ignition cycle. An ignition cycle may be a period of time between key on (e.g., key in a RUN position) and key off (e.g., key in an OFF position). The conditions may be periodically evaluated to determine when a stop/start cycle of the engine 112 can be performed to improve fuel economy. For example, the powertrain controller 120 may autostop the engine 112 when detecting a brake application and/or vehicle speed falling below a threshold (e.g., near zero). During an autostop event, the powertrain controller 120 may prevent fuel flow to the engine 112 and cause the engine to decrease to zero speed.

Autostarting the engine 112 may be based on another set of conditions. For example, when an operator releases the brake pedal, the powertrain controller 120 may autostart the engine 112. During an autostarting event, the powertrain controller 120 may control the electric machine 114 to rotate the engine 112, cause fuel to flow to the engine 112, and cause spark to ignite the fuel.

The powertrain controller 120 may be coupled to the battery 116, the electrical loads 118, the electric machine 114, and the engine 112 via a vehicle network 124. The vehicle network 124 may include discrete hardware connections between modules. The vehicle network 124 may include a communications network in which the modules/controllers may communicate serially. In some configurations, the powertrain controller 120 may coordinate the operation of multiple controllers to perform autostop and autostart of the engine 112. For example, an engine controller may communicate with the powertrain controller 120 via the communications network (e.g., Controller Area Network (CAN)). The vehicle network 124 may include, but is not limited to, a Controller Area Network (CAN) bus, a Local Interconnect Network (LIN) bus, a Media Oriented System Transport (MOST) bus, and/or an Ethernet bus, or a FlexRay bus.

An engine autostop/start event or cycle may include several stages: "autostop begin," which marks the beginning of the engine autostop event; "preparing for engine autostop," which is the time period during which vehicle systems as well as the engine are prepared for the impending engine stop (if an autostop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed reduces to zero; "below fuel restart," which marks the point after which if a restart is requested during the "engine stopping" stage, the starter may need to be engaged to crank the engine (if a restart is requested before "below fuel restart" and during the "engine stopping" stage, the engine may be restarted by turning the flow of fuel back on); "engine speed=zero," which marks the point at which the engine speed is near or equal to zero; "engine autostopped," which is the time period during which the engine is off; "starter engage," which marks the point at which the starter starts to crank the engine in an effort to start the engine (in response to detecting an engine autostart condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed (a speed at or above target idle speed); and, "autostart end," which marks the point at which the speed of the engine achieves its running speed.

The vehicle 110 may further include a telematics control unit (TCU) 130. The TCU 130 may include a controller having a processing unit and persistent and non-persistent storage. The non-persistent storage may include random access memory (RAM) and the persistent storage may include flash memory or a hard-disk drive (HDD). Non-transitory memory may include both persistent memory and RAM. In general, persistent storage may include all forms of memory that maintain data when a computer or other device is powered down including, but not limited to, HDDs, solid state drives, portable USB drives and any other suitable form of persistent memory.

The vehicle 110 may include a cellular communication device or modem 132 having an antenna and configured to establish communication via a cellular tower 136. In some configurations, the modem 132 may be incorporated as part of the TCU 130. The modem 132 may be used to establish a vehicle-tower communication path for communicating data between the TCU 130 and a network 138 over the voice band. In some configurations, the modem 132 may establish a vehicle-tower communication path directly with the cellular tower 136 for communicating with the network 138. As a non-limiting example, the modem 132 may be a USB cellular modem and vehicle-tower communication path may be cellular communication.

In the data-over-voice configuration, a technique known as frequency division multiplexing may be implemented when the vehicle owner may talk via the modem 132 while data is being transferred. At other times, when the communication path is not in use, the data transfer can use the whole bandwidth (300 Hz to 3.4 kHz in one example). While frequency division multiplexing may be common for analog cellular communication between the vehicle and the internet, and is still used, it has been largely replaced by hybrids of Code Division Multiple Access (CDMA), Time Division Multiple Access (TDMA), Space-Division Multiple Access (SDMA) for digital cellular communication, including but not limited to Orthogonal Frequency-Division Multiple Access (OFDMA) which may include time-domain statistical multiplexing. These are all International Telegraph Union (ITU) International Mobile Telecommunication (IMT) 2000 (3G) compliant standards and offer data rates up to 2 Mbps for stationary or walking users and 385 Kbps for users in a moving vehicle. 3G standards are now being replaced by IMT-Advanced (4G) which offers 100 Mbps for users in a vehicle and 1 Gbps for stationary users. If the user has a data-plan associated with the modem 132, it is possible that the data-plan allows for broadband transmission and the system could use a much wider bandwidth (speeding up data transfer).

In some configurations, the vehicle 110 may include a wireless local area network (LAN) device or router 134 capable of communication over, for example (and without limitation), an IEEE 802.11g network (i.e., WiFi) or a WiMax network. The TCU 130 may establish communication with the network 138 vis the router 134. The TCU 130 may be programmed to implement communication drivers to interface with the router 134 and communicate with the network 138. This allows the TCU 130 to connect to remote networks 138 in range of the local router 134. In some configurations, the router 134 and the modem 132 may be combined as an integrated unit as part of the TCU 130. However, features to be described herein may be applicable to configurations in which the modules are separate or integrated.

The vehicle 110 may include a global positioning system (GPS) receiver 146 that is configured to provide GPS coordinates of a present location of the vehicle 110. The GPS receiver 146 may be part of a navigation or trip assistance system. The TCU 130 and powertrain controller 120 may be in communication with the GPS receiver 146 via the vehicle network 124.

The TCU 130 may be configured to transfer data between the vehicle network 124 and a server 140 that is in communication with the network 138. The server 140 may be operated by a vehicle manufacturer or other third-party. The TCU 130 may include appropriate interface hardware and software for communicating via the vehicle network 124. The TCU 130 may be configured to manage all communication with the network 138. For example, the TCU 130 may operate as a gateway to the network 138.

The vehicle 110 may include a human-machine interface (HMI) 142 that is configured to interface with the vehicle operator. The HMI 142 may include a processing unit and a display unit. The display unit may be a touchscreen that permits display of information and entry of information. For example, the HMI 142 may display possible selections in a list or as virtual buttons. When the screen is touched at a location to select an action, the screen location data may be passed to the processing unit which may be programmed to perform the selected action (e.g., instruction associated with the touched screen position). The HMI 142 may also interface to one or more buttons or switches 144. The HMI 142 may be configured to input the status of the switches 144 and perform operations according to the status.

The vehicle 110 may include a feature that allows the operator to inhibit a fuel-saving feature. The HMI 142 may be configured to provide an interface to inhibit engine start/stops. For example, the HMI 142 may implement a menu structure in which one of the selections is to inhibit engine start/stops. The selection may be made by the user with a switch 144 or a virtual button on the touchscreen. The inhibit engine start/stop selection may be transferred to the powertrain controller 120. The powertrain controller 120 may be programmed to inhibit automatic engine start/stops in response to the inhibited feature being selected. In the inhibited mode, the powertrain controller 120 may operate the engine 112 in an always on state. The HMI 142 may further provide enable/disable selection for a variety of vehicle features, including other fuel-saving features.

A variety of reasons may exist for the operator to select the inhibit engine start/stop feature. The operator may dislike the noise made by the engine 112 after restarting. The operator may prefer that the engine 112 remain on instead of being stopped. By inhibiting engine start/stops, fuel economy may be reduced. In some cases, other conditions may cause an engine autostop/start to be avoided or inhibited. For example, an engine start/stop may be dependent on satisfaction of a predetermined number of conditions. If any one of the predetermined conditions is not satisfied, the engine start/stop cycle may be avoided. This can lead to consumer dissatisfaction as fuel economy benefits of the technology are not realized. Increased use of the HMI interface 142 to inhibit engine start/stop may reduce fuel economy and the ability to claim off-cycle credits afforded to engine start/stop technology.

In order to evaluate fuel-saving technologies such as engine start/stop, data associated with operation of the feature may be collected and evaluated. Data may be collected during vehicle operation by monitoring the vehicle network 124. A data collection module having a large persistent storage capacity may be connected to the vehicle network 124 to collect signals transferred over the vehicle network 124. The data collection module may be placed in a number of vehicles to collect data. For example, the data collection modules could be placed in vehicles that are part of an employee fleet. Installation and retrieval of the data collection modules may require physical access to the vehicles. Physical access restricts usage of this scheme to vehicle fleets at one location and limits data collection to a single nearby area. Installing data collection modules in for-sale vehicles is not effective for cost and convenience reasons. Another limitation of such a strategy is that the data collection is limited to information that is carried on the vehicle network 124. The data may not be of sufficient resolution or timing to provide a complete picture of the system operation. Further, values that may be of particular interest may be internal values of the powertrain controller 120.

An improved data collection methodology may be to implement a communication-based strategy using the onboard modem 132 and/or router 134. This strategy can provide a wider geographic variation of data since vehicles are not constrained to one locale (e.g., no physical access required once the vehicle is deployed). Vehicle fuel-saving features may be monitored in different regions that differ in climate, traffic conditions, terrain, and drive cycles. Using a strategy based on collecting data using the onboard modem 132 provides a better indication of how features/technology are performing in real-world conditions. Such data can provide a better justification for off-cycle credits.

A modem-based analytics framework can aid in supporting EPA off-cycle credit applications. The framework can also improve understanding of consumer usage of fuel-saving technologies such as engine start/stop. The framework may also provide data for developing system improvements and generating Over-The-Air (OTA) updates. For example, data may lead to software updates that may be downloaded via the modem 132 or router 134. The framework may define software and analytics for leveraging on-vehicle computation and communication capabilities to provide high-quality data for fuel-saving features such as engine start/stop performance and on-road data needed for EPA off-cycle credit applications and personalized consumer-facing information about fuel savings from fuel-saving features. The framework is described using engine start/stop as an example of a fuel-saving feature. However, the system and methods can be generalized to other features or fuel-saving technologies. For example, the framework can be used for evaluating and understanding performance of high-efficiency alternators and/or electrified powertrains.

The system may implement an on-vehicle data collection function. The on-vehicle data collection function may be performed by the TCU 130. The on-vehicle data collection function may perform computations for quantifying a distribution of engine start/stop inhibits (e.g., reasons that the fuel-saving system did not engage) and engine start/stop effectiveness (e.g., actual observed fuel savings). More generally, the on-vehicle data collection function may collect data associated with a fuel-saving feature that is implemented in the vehicle. Data collected may include inhibit conditions that quantify reasons for which the fuel-saving feature did not engage when expected to. The data collected may also include values to aid in the determination of the effectiveness of the fuel-saving feature.

Operation of fuel-saving features or systems may be inhibited based on various inhibit conditions. Some of the inhibit conditions may be implemented for safety reasons. For example, inhibit conditions may be included to prevent a situation in which an engine start/stop causes an engine autostop but the battery 116 has inadequate power for completing an engine autostart. Other inhibit conditions may be implemented for performance consideration and/or to improve the consumer experience. For example, an engine autostop may be inhibited when an angle at which the steering wheel is turned exceeds a predetermined angle. In this situation, it may be anticipated that a next move of the driver is imminent and may require immediate propulsion power. As such, autostopping the engine 112 may lead to a delay in achieving the expected propulsion power request.

The system may be configured to monitor the amount of time that fuel-saving feature should be activated or engaged. In the example of a start/stop feature, the system may monitor the amount of time each of the engine autostop conditions are satisfied. In addition, the system may be configured to monitor the amount of time that the fuel-saving feature is inhibited due to the inhibit conditions. The inhibit conditions may be observed during time intervals when activation of the fuel-saving feature is expected. For example, the inhibit conditions may be monitored when conditions for autostopping the engine 112 are present.

The system may be configured to compute lifetime and trip effectiveness using a standardized method suitable for reporting to the EPA. The TCU 130 may transfer lifetime and/or trip effectiveness data via the modem 132 at predetermined intervals to the server 140. The predetermined intervals may be based on data transfer cost. As data transfer costs decrease, data may be transferred at an idle event level (e.g., each engine start/stop event). The predetermined interval may be upon completion of a trip and/or ignition cycle.

The system may include automated cloud-based updates for visualizing results and detecting issues and/or consumer behavior. The automated updates may be implemented in the server 140. The server 140 may be programmed to periodically (e.g., monthly) query the TCU 130 to transmit data that has been collected since the last transfer. The TCU 130 may transfer the requested data to the server 140. The server 140 may be programmed to analyze the data and identify possible EPA off-cycle credit opportunities suggested by the data. The server 140 may collect data from a plurality of vehicles. For example, data may be collected from every manufacturer nameplate. The server 140 may aggregate the data by model year and/or nameplate. The server 140 may be configured to provide graphs of the inhibit data and distributions to inform product developers of possible improvements.

The system may be configured to provide consumer-facing information about system performance. The system may inform the operator of system benefits to discourage use of the HMI inhibit button 144 that prevents the fuel-saving feature from engaging during the current trip. The system may compute and display values indicative of a lifetime fuel savings and a last trip fuel savings from using the fuel-saving feature (e.g., engine start/stop). The values may include a fuel cost saving estimate and a CO2 savings estimate based on the carbon intensity of the fuel used. The system may provide suggestions for improving operation to reduce inhibit conditions. For example, a message may be displayed such as "By reducing the AC level below Max AC, you can save X gallons of fuel, or $Y.YY and Z grams of $CO_2$ on your next trip."

Advantages of the communication-based data analytics system includes the collection of on-road data from potentially every vehicle on the road. The system allows fuel-savings data to be collected that better characterizes on-road usage of the vehicle 110. By leveraging the communication interface, the performance of lower volume nameplates may be assessed for possible off-cycle credits. The modem-data approach increases the number of available vehicles for generating performance data. More data may provide a more compelling case for receiving off-cycle credits.

The powertrain controller 120 may be programmed to implement the fuel-saving feature (e.g., engine start/stop logic). The following discussion uses the engine start/stop features as an example of a fuel-saving feature. The powertrain controller 120 may receive signals and assess the transition conditions for the fuel-saving feature. For the engine start/stop example, the powertrain controller 120 may receive signals indicative of accelerator pedal position, brake pedal position, vehicle speed, steering wheel position, parking brake status, gear selector position, and engine speed. The powertrain controller 120 may be configured to evaluate transition conditions for transitioning the engine 112 between autostop and autostart states. The powertrain controller 120 may periodically evaluate the transition conditions to determine if the engine state should be changed.

A first set of conditions may be categorized as conditions in which activation or engagement of the fuel-saving feature is probable. For example, for the engine start/stop feature, the first set of conditions may represent an idle event. The powertrain controller 120 may be configured to detect when vehicle speed is zero or less than a threshold near zero. The idle event condition may indicate a condition in which propulsion power is not expected to be needed. The first set of conditions may be generalized to be indicative of conditions in which activation of the fuel-saving feature is expected or probable.

A second set of conditions may be categorized as conditions that activate or engage the fuel-saving feature. For example, the second set of conditions may be categorized as engine autostop conditions. Engine autostop conditions may be those conditions that, when satisfied, cause an engine autostop. For example, autostop conditions may include the brake pedal position exceeding a threshold and vehicle speed being less than a speed threshold. The second set of conditions may be generalized to be indicative of conditions in which activation of the fuel-saving feature is actually engaged or activated.

A set of inhibit conditions may be categorized as inhibit conditions that disengage or delay the fuel-saving feature. For example, the inhibit conditions may be those conditions that, when satisfied, inhibit an engine autostop. For example, inhibit conditions may include the battery voltage being less than a threshold and the steering wheel angle exceeding a predetermined angle. Other inhibit conditions may include the status of electrical loads 118, such as an air conditioning system. Some electrical loads 118 may require the engine 112 to be running to supply sufficient power for operating the electrical load.

A third set of conditions may be categorized as conditions that cause a normal exit of the fuel-saving feature (e.g., engine autostart conditions). Engine autostart conditions may be those conditions that, when satisfied, cause an engine autostart. For example, autostart conditions may include accelerator pedal position exceeding a threshold and brake pedal position being less than a threshold. The third set of conditions may be generalized to be indicative of conditions in which the fuel-saving feature is disengaged or deactivated due to a normal exit of the fuel-saving feature.

The time that the fuel saving feature is engaged may be determined as the difference in time between engaging the fuel saving feature (e.g., autostopping the engine 112) and disengaging the fuel saving feature (e.g., autostarting the engine 112). The powertrain controller 120 may sample a time value associated with engagement and disengagement of the fuel-saving feature.

The powertrain controller 120 may monitor the status of each of the conditions. The conditions may include those that activate, inhibit and/or exit the fuel-saving feature. For example, each condition may be associated with a flag or variable. The flag may be set when the condition is satisfied and cleared when the condition is not satisfied. The powertrain controller 120 may periodically evaluate each of the conditions and store the status in memory for later transfer. The powertrain controller 120 may further evaluate the amount of time that each condition is present.

The powertrain controller 120 may be programmed to cause the engine to transition to an autostop state upon satisfaction of transition conditions and inhibit the transition according to satisfaction of inhibit conditions. The powertrain controller 120 may be configured to, responsive to the transition conditions being satisfied and the autostop being inhibited, accumulate data indicative of the inhibit conditions and a time associated with the transition conditions being satisfied. The powertrain controller 120 may be programmed to estimate a value indicative of an impact on fuel economy associated with the data and the time. The powertrain controller 120 may be further programmed to estimate a fuel cost associated with the data and the time. The estimated value of impact on fuel economy may be output to the HMI 142 for display to the operator.

The powertrain controller 120 may be configured to accumulate data indicative of the transition and inhibit conditions and associated times or durations over each ignition cycle and/or a lifetime of vehicle 110. The powertrain controller 120 may be programmed to estimate an amount of $CO2$ associated with the transition and inhibit conditions and associated times and durations. The powertrain controller 120 may be programmed to estimate a value indicative of an impact on fuel economy associated with the transition and inhibit conditions and associated times and durations. The powertrain controller 120 may be programmed to estimate a value indicative of a fuel cost associated with the transition and inhibit conditions and associated times and durations. The estimated fuel cost value may be output to the HMI 142 for display to the operator.

The server 140 may be configured to receive the state of each condition for each possible fuel-saving feature event (e.g., engine start/stop event). For example, when the conditions for performing an engine autostop are satisfied, the inhibit conditions may be recorded. The actual engine state (e.g., off, running) may also be monitored. In the case where inhibit conditions are present, the engine autostop may not be performed. This results in a situation in which an engine autostop could have been performed but was inhibited. The inhibit conditions may impact fuel savings as the engine 112 is not stopped. It may be useful to identify the inhibit condition that caused the engine autostop to be canceled.

Figure 2:
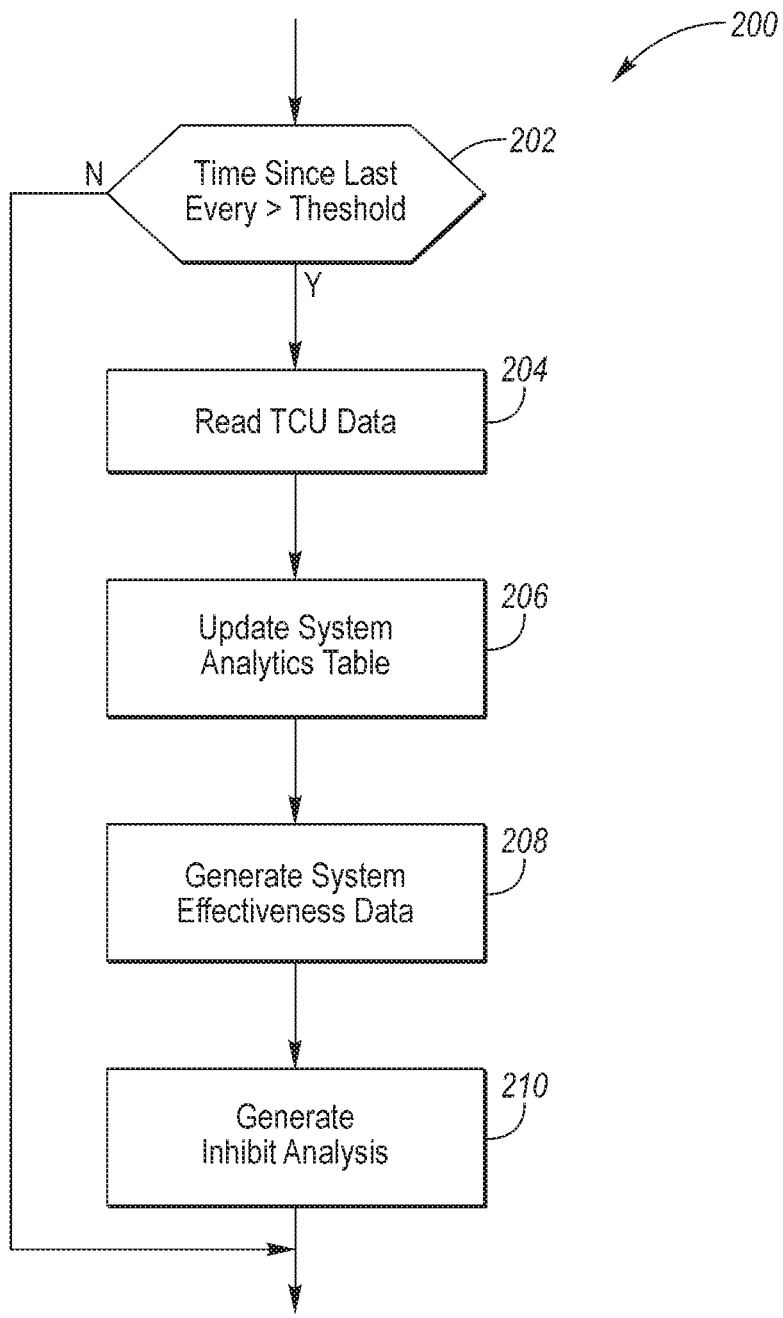
FIG. 2 is a flowchart for a possible sequence of operations for periodically updating and analyzing vehicle-related information.

FIG. 2 depicts a possible sequence of operations that may be implemented in the server 140 for processing vehicle-related data. The server 140 may track data from any number of vehicles (e.g., a fleet of vehicles). The process may be repeated for each vehicle in the fleet. At operation 202, a time since a last query may be compared to a threshold. For example, the threshold may be one month. The server 140 may periodically request data from the vehicle 110. For example, the server 140 may send a query for most recent data to the vehicle 110. If the time since the last query is less than the threshold, no additional operations may be performed. If the time since the last query exceeds the threshold, operation 204 may be performed. The TCU 130 may be configured to accumulate and store that data between retrieval events.

At operation 204, the server 140 may request and receive data from the TCU 130. The server 140 may transmit a request via the network 138 for the TCU 130 to transmit the latest fuel-savings data. The TCU 130 may receive the request through the modem 132 or the router 134. The TCU 130 may respond by transferring the data to the server 140. At operation 206, the server 140 may update a system analytics table. The system analytics table may store vehicle data that has been retrieved from vehicles. The powertrain controller 120 and the TCU 130 may be sources of the vehicle data. The vehicle data may include a trip identifier (ID). The TCU 130 may generate the trip ID to be a unique value. The TCU 130 may generate the trip ID by combining a vehicle identification number (VIN) and a timestamp. The timestamp may be a time recorded by the TCU 130 at a time when the data is processed by the TCU 130.

The vehicle data may include a total trip time associated with the trip ID. The vehicle data may include a potential engagement time that represents an amount of time that a fuel-saving feature could have been engaged during the trip associated with the trip ID (e.g., idle event). For example, the potential engagement time may be an amount of time that conditions were present for activating an engine stop event. The vehicle data may include a total engagement time that represents an amount of time that the fuel-saving feature was actually activated or engaged during the trip associated with the trip ID. For example, the total engagement time may be an amount of time that the engine was actually stopped as a result of the engine start/stop feature.

The vehicle data may include an estimate of trip fuel savings from the fuel-saving feature (e.g., engine start/stop). The vehicle data may include a trip average ambient air temperature and a trip average vehicle speed. The vehicle data may include a trip end odometer value and a trip average GPS value. The average GPS value may identify the location of the vehicle at a city level. The location information may allow data to be analyzed based on locations to compare effectiveness of fuel-saving features at different locations.

The vehicle data may include data associated with inhibit conditions that delay or preempt engagement of the fuel-saving feature. The number of inhibit conditions for a fuel-saving feature depends on the characteristics of the fuel-saving feature. Each of the inhibit conditions may be identified with a predetermined identifier. The inhibit condition data may include a cumulative trip time in which the inhibit condition is satisfied when the fuel-saving feature would have otherwise been engaged.

The vehicle data may be accumulated and stored by the powertrain controller 120 and/or the TCU 130. The TCU 130 may transfer the vehicle data to the server 140. The vehicle data may be received by the server 140 and stored in the system analytics table. The system analytics table may be stored in non-volatile memory for later retrieval. At operation 208, the server 140 may generate system effectiveness data or analysis. For example, the server 140 may compute a cumulative system effectiveness by nameplate, model year, and ambient air temperature for analyzing off-cycle credits or other use. The system analytics table may be parsed for vehicle data from a particular nameplate and model year. This information may be incorporated in the trip ID which include VIN information. The server 140 may aggregate the data by particular selection criteria to provide analysis data for the selected criteria.

As an example, the server 140 may compute a sum of the potential engagement time and a sum of the total engagement time for a given model year and/or nameplate vehicle. The values may be indicative of the effectiveness of the fuel-saving feature. Further analysis may lead to modifications for improving the system effectiveness. The effectiveness values could be an average fuel savings or an average $CO2$ savings associated with the fuel-saving feature. The effectiveness may also be analyzed as the percentage of time the fuel-saving feature is inhibited relative to the total time that the fuel-saving feature is expected to be engaged.

At operation 210, the server 140 may generate an inhibit condition analysis. The server may parse the vehicle data for a specified nameplate and/or model year to analyze the inhibit conditions. The server 140 may generate a sum of the cumulative inhibit condition times for each inhibit condition. The total cumulative trip times may be compared to the potential engagement time to identify inhibit conditions that may be reducing fuel savings. The server 140 may display data as a plot or in tabular form.

The data for the inhibit conditions may aid product designers in improving the performance of the fuel-saving feature. The processed data allows identification of inhibit conditions that are interrupting or delaying activation of fuel-savings feature and potentially reducing fuel savings. For example, it may be observed that an inhibit condition occurs more frequently than others. Product designers may change a threshold associated with the inhibit condition and provide a software update with the updated threshold. In future time periods, vehicle data may be analyzed to determine if the threshold change altered the performance as intended.

Figure 3:
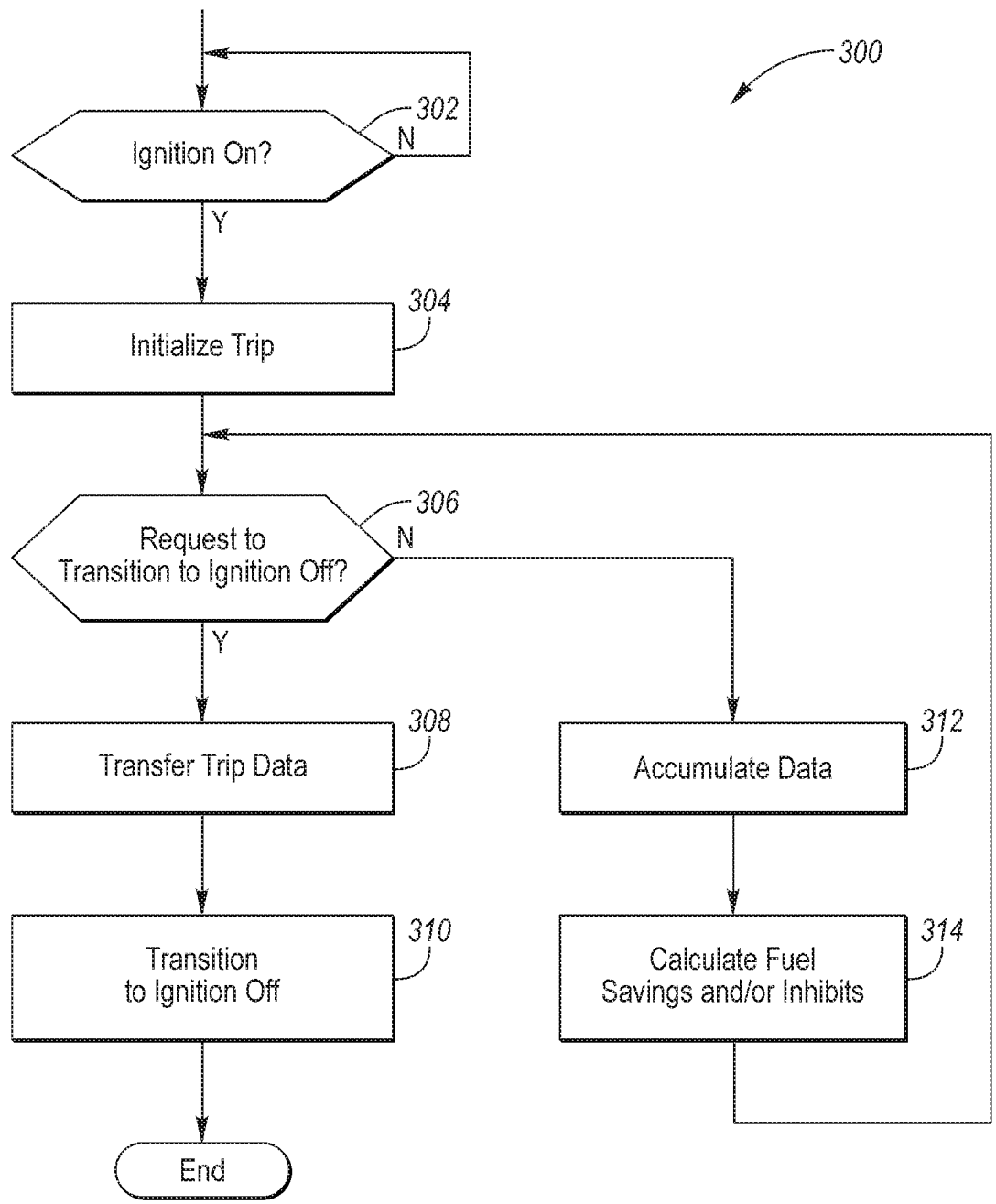
FIG. 3 is a flowchart for a possible sequence of operations for collecting and transferring data related to fuel-saving features in a vehicle.

FIG. 3 depicts a flowchart of a possible sequence of operations that may be performed by controllers in the vehicle 110. For example, operations may be distributed between the powertrain controller 120 and the TCU 130. At operation 302, the system may check if the ignition has been switched on (e.g., start of ignition cycle). The ignition on condition may be initiated by turning a key to a run position or engaging a start button. If the ignition is not switched on, the system may continue to monitor for the ignition on condition. If the ignition is switched on, operation 304 may be performed. An ignition on condition may be indicative of a start of a trip or drive cycle.

At operation 304, the in-vehicle components of the data collection and analytics system may be initialized. The powertrain controller 120 and the TCU 130 may initialize various parameters and variables. For example, counter values may be initialized to zero. The powertrain controller 120 and/or the TCU 130 may record a trip start time, a trip start location, and a trip start odometer value.

At operation 306, instructions may be executed to check if there is a request to transition to an ignition off condition. A request to transition to ignition off may indicate an end of the trip or ignition cycle. The request may be detected based on a key position. For example, the key may be switched to an off position. In addition, the request may be detected based on a press of a start/stop switch. If there is no request to transition to ignition off, operation 312 may be performed.

At operation 312, the system may accumulate vehicle trip data. The vehicle trip data may include the vehicle data discussed above. Data accumulation may be performed by the powertrain controller 120. The powertrain controller 120 and/or the TCU 130 may periodically sample and store variables associated with the vehicle data described. The data accumulation process may be further described with reference to FIG. 4 as detailed below.

At operation 314, the system may calculate fuel savings and record data related to the inhibit conditions. The powertrain controller 120 may update data associated with each of the inhibit conditions that cause the fuel-saving feature to be delayed or interrupted. The powertrain controller 120 may increment a time value associated with the presence of each of inhibit conditions. The powertrain controller 120 may compute a fuel savings associated with the fuel-saving feature. The powertrain controller 120 may estimate a fuel economy impact of the inhibit conditions over the course of an ignition cycle. The estimated fuel economy impact may be output to a display for review by the operator. The estimated fuel economy impact may be stored for later retrieval (e.g., trip history information) and display.

If a request to transition to ignition is received at operation 306, operation 308 may be performed. At operation 308, vehicle trip data may be stored and/or transferred. For example, the powertrain controller 120 may transfer the accumulated trip data to the TCU 130 for storage and transmission to the server 140. The TCU 130 may store the accumulated trip data in non-volatile memory. The TCU 130 may also assign a trip ID to the accumulated data for later identification. For vehicle data that is averaged, the powertrain controller 120 may compute the average values before transmission. In some configurations, the TCU 130 may compute the average values after receipt of the vehicle trip data.

At operation 310, the system may transition to ignition off. The controllers may perform instructions to control shutdown of the powertrain and vehicle systems. The controllers may then await the next ignition on cycle.

Figure 4:
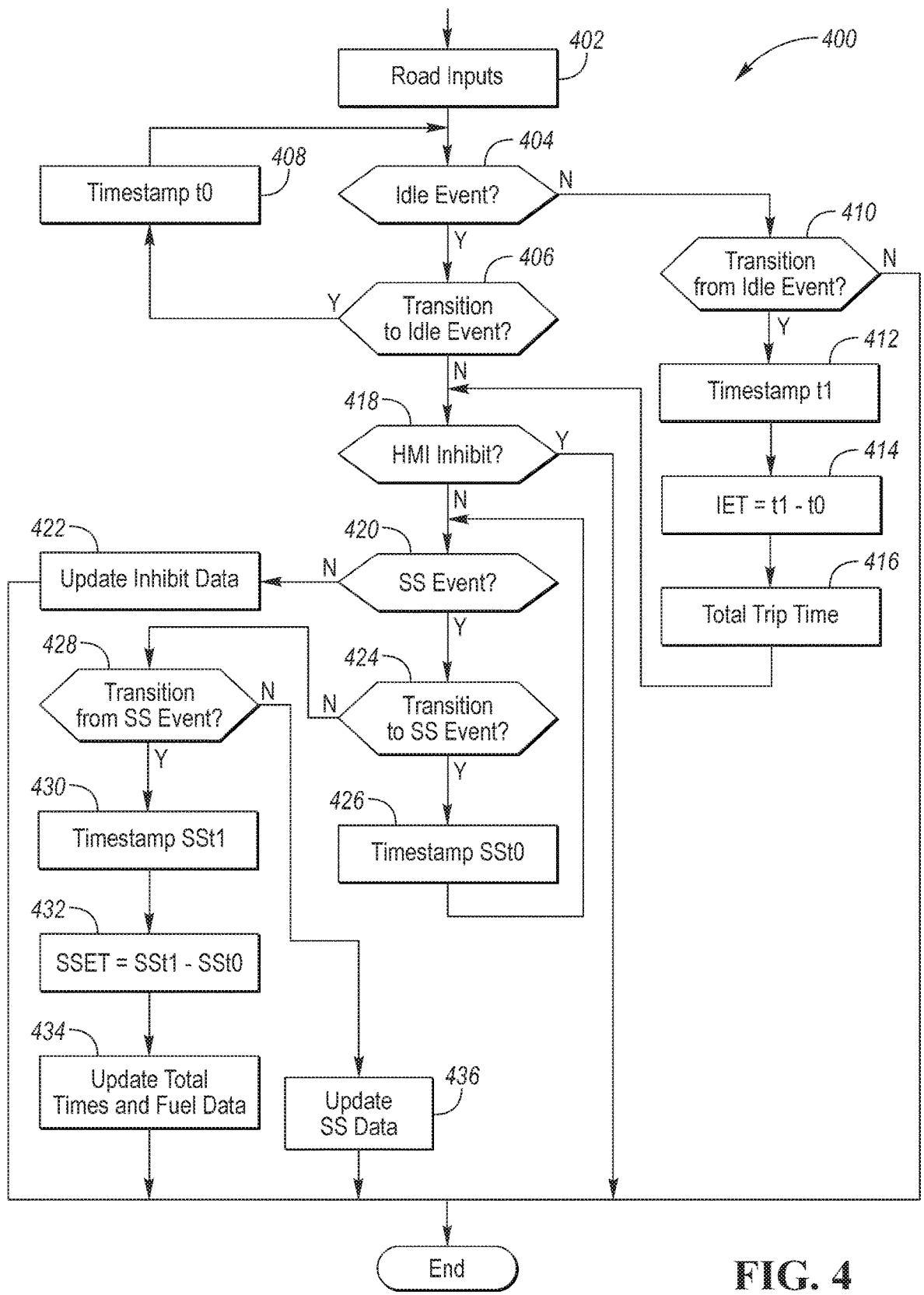
FIG. 4 is a flowchart for a possible sequence of operation for collecting and processing data related to an engine start-stop system.

FIG. 4 is a flowchart for a possible sequence of operations that may be periodically performed as part of accumulating data (e.g., 312) and calculating fuel savings and/or inhibits (e.g., 314) operations of FIG. 3. The process is described in relation to an engine start/stop feature but is applicable to other fuel-savings features with minor adjustments. At operation 402, the powertrain controller 120 may read inputs that are associated with the vehicle data. The powertrain controller 120 may sample sensors at periodic intervals to update the values of the vehicle data. For example, the powertrain controller 120 may receive signals from an air temperature sensor. The powertrain controller 120 may monitor internal state variables to determine when a fuel-saving feature can be engaged. The powertrain controller 120 may increment a time value for each interval in which the fuel-saving feature can be engaged based on a set of conditions. The powertrain controller 120 may further compute or receive a vehicle speed value for storage. The powertrain controller 120 may further receive and store a GPS location value. The powertrain controller 120 may periodically accumulate and store the vehicle data in memory.

At operation 404, a check may be performed to determine if conditions are present for an idle event. An idle event may be described as a state in which the ignition is in a run state and the vehicle speed is zero or less than a threshold indicative of zero speed. An idle event may be indicative of a state in which the vehicle is stopped and not requiring propulsion. Under ideal conditions, the engine 112 may be in an off state during the idle event. If an idle event is detected, operation 406 may be performed. The condition may be generalized to be a condition in which the fuel-saving feature is expected to be engaged or activated.

At operation 406, a check may be performed to determine if the vehicle has just transitioned to the idle event (e.g., last idle event status was false). If the system has just transitioned to the idle event, operation 408 may be performed. At operation 408, parameters and values may be initialized. In addition, a timestamp t0 may be recorded and stored. The powertrain controller 120 may sample and store a timer value as the start of the idle event.

If the system has not just transitioned to the idle event (e.g., last idle event status was true), operation 418 may be performed. At operation 418, the status of an HMI inhibit may be checked. In some configurations, the status of the HMI inhibit may be recorded and stored for later transmission to the server 140. Analysis of engine start/stop cycles preceding the activation of HMI inhibit may provide insight into the reasons that the operator pressed the HMI inhibit. Further, the system may later compute fuel-savings lost due of the HMI inhibit being activated.

If the HMI inhibit is not active, operation 420 may be performed. At operation 420, a check may be performed to determine if a start/stop event is in progress. The check may be generalized as determining if the fuel-saving feature has been engaged or activated. If a start/stop event is not in progress, operation 422 may be performed.

At operation 422, the system may update the inhibit condition data. As the check is performed during an idle event, it may be expected that a start/stop event is probable. The status of each of the inhibit conditions may be updated and a time associated with each inhibit condition may be updated to reflect the amount of time that the inhibit condition has been active. The system may update a cumulative time for each inhibit condition. This may be repeated for each inhibit condition. Later analysis may show which inhibit conditions most frequently occur.

If a start/stop event is active, operation 424 may be performed. At operation 424, a check may be performed to determine if the system is transitioning to the start/stop event (e.g., last state was no start/stop event). If the system has just transitioned to the start/stop state, operation 426 may be performed. At operation 426, a timestamp SSt0 may be updated with a present time. The timestamp SSt0 may represent the beginning of the start/stop event.

If the system has not just transitioned to the start/stop state, operation 428 may be performed. At operation 428, a check may be performed to determine if the system is transitioning out of the start/stop state. For example, conditions exiting the start/stop cycle may be checked. If the system is not transitioning out of the start/stop state (e.g., remains in the start/stop event), operation 436 may be performed. At operation 436, start/stop data variables may be updated. For example, vehicle speed, GPS location, and ambient air temperatures may be stored. In addition, the status of the entry and exit conditions may be updated along with the associated durations.

If the system is transitioning out of the start/stop state, operation 430 may be performed. At operation 430, a timestamp SSt1 may be recorded. The timestamp SSt1 may represent the end of the start/stop event. At operation 432, a start/stop event time (SSET) may be computed as the difference between timestamp SSt1 and timestamp SSt0. The SSET may represent the amount of time that the system was in the start/stop event. That is, the amount of time that the engine was off (e.g., fuel-saving feature engaged). More generally the system may compute an amount of time that the fuel-saving feature was engaged.

At operation 434, the system may update the total times and fuel data. A cumulative or total trip idle time may be incremented with by the amount of the SSET. A cumulative or total trip fuel savings from the start/stop feature may be incremented with the product of the SSET and the idle fuel flow rate and decremented by the fuel injection amount to restart the engine.

At operation 404, if the idle event is not detected, operation 410 may be performed. At operation 410 a check may be performed to detect if the system is transitioning from the idle event (e.g., last cycle was an idle event). If the system is transitioning from an idle event, operation 412 may be performed. At operation 412, a timestamp t1 may be recorded. At operation 414, an idle event time may be computed as the difference between timestamp t1 and timestamp t0. The idle event time may represent a duration during which the fuel-saving feature was expected to be engaged. At operation 416, a total trip idle time may be computed. The total trip idle time may be computed by accumulating the values of the idle event time for each idle event. The total trip idle time may represent the amount of time that the fuel-saving feature is expected to be engaged.

The powertrain controller 120 may accumulate the vehicle trip data over the ignition cycle. The powertrain controller 120 may transfer the vehicle trip data to the TCU 130 at the end of the ignition cycle. In some configurations, the powertrain controller 120 may transfer data associated with each idle event at the completion of each idle event. The TCU 130 may store and accumulate the vehicle data. In some configurations, the TCU 130 may periodically transfer the vehicle data to the server 140.

The system described allows collection of data for fuel-saving features that include real performance data for different vehicles and operators. The system may capture data that covers different terrains and operator driving habits. The system allows for detailed analysis of fuel-saving features and provides a basis for applying for EPA off-cycle credits. The system can compute the true distribution of fuel-saving feature inhibit conditions using actual data from the powertrain controller 120.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle provided with a fuel savings feature, comprising:
a controller programmed to
responsive to detecting an inhibit condition in a presence of an activation condition for the fuel savings feature being satisfied, inhibit an activation of the fuel saving feature;
responsive to the activation condition being satisfied and the fuel savings feature not being activated, accumulate data indicative of the inhibit condition and a time associated with the inhibit condition, the time being calculated from an occurrence of the activation condition to an occurrence of a deactivation condition for the fuel savings feature;
estimate an amount of fuel consumed during the time of the inhibit condition;
calculate a fuel cost using the amount of fuel and a fuel price, and an amount of $CO_2$ caused by the consumption of the amount of fuel;
generate an improvement suggestion for a user to operate the vehicle to avoid further triggering the inhibit condition; and
output for display the improvement suggestion with the fuel cost and amount of $CO_2$.

2. The vehicle of claim 1 wherein the fuel savings feature is an engine start/stop feature.

3. The vehicle of claim 1 wherein the controller is further programmed to, responsive to a request to transfer data, transfer the data and the time to a server.

4. The vehicle of claim 1 wherein the controller is further programmed to estimate a value indicative of an impact on fuel economy associated with the data and the time.

5. The vehicle of claim 1 wherein the controller is further programmed to estimate a fuel cost associated with the data and the time.

6. The vehicle of claim 1 wherein the controller is further programmed to accumulate the data and time over an ignition cycle.

7. The vehicle of claim 1 wherein the controller is further programmed to accumulate the data and the time over a lifetime of the vehicle.

8. A method comprising:
inhibiting, by a controller, a fuel savings feature for a vehicle responsive to satisfaction of an inhibit condition in a presence of activation conditions for the fuel savings feature being satisfied;
accumulating, by the controller, data indicative of the inhibit condition and a time associated with the inhibit condition, the time being calculated from an occurrence of at least one activation condition to an occurrence of a deactivation condition for the fuel savings feature;
transferring, by the controller, the data and time to a server;
estimating, by the controller, an amount of fuel consumed during the time of the inhibit condition;

calculating a fuel cost using the amount of fuel and a fuel rice and an amount of CO2 caused by the consumption of the amount of fuel;
generating an improvement suggestion for operating the vehicle to avoid further triggering the inhibit condition; and
outputting, by the controller via a human machine interface (HMI), the improvement suggestion with the fuel cost and amount of CO2.

9. The method of claim 8 further comprising aggregating, by the server, data from vehicles having a same nameplate and model year.

10. The method of claim 8 further comprising, requesting, by a server, transfer of the data and time at periodic intervals from the controller.

11. The method of claim 8 further comprising accumulating the data and time over an ignition cycle and a vehicle lifetime.

\* \* \* \* \*